(12) United States Patent
Curtis-Maury et al.

(10) Patent No.: US 10,417,189 B2
(45) Date of Patent: Sep. 17, 2019

(54) HYBRID MODEL OF FINE-GRAINED LOCKING AND DATA PARTITIONING

(71) Applicant: NetApp, Inc., Sunnyvale, CA (US)

(72) Inventors: Matthew Curtis-Maury, Apex, NC (US); Vinay Devadas, Apex, NC (US); Aditya Kulkarni, Morrisville, NC (US)

(73) Assignee: NETAPP, INC., Sunnyvale, CA (US)

( * ) Notice: Subject to any disclaimer, the term of this patent is extended or adjusted under 35 U.S.C. 154(b) by 280 days.

(21) Appl. No.: 14/928,452

(22) Filed: Oct. 30, 2015

(65) Prior Publication Data

US 2017/0124109 A1 May 4, 2017

(51) Int. Cl.
*G06F 16/176* (2019.01)
*G06F 16/18* (2019.01)

(52) U.S. Cl.
CPC ...... *G06F 16/1774* (2019.01); *G06F 16/1858* (2019.01)

(58) Field of Classification Search
CPC .................. G06F 16/1774; G06F 16/1858
See application file for complete search history.

(56) References Cited

U.S. PATENT DOCUMENTS

| | | | |
|---|---|---|---|
| 5,212,788 A | 5/1993 | Lomet et al. | |
| 5,960,194 A * | 9/1999 | Choy | G06F 9/355 |
| 6,658,652 B1 | 12/2003 | Alexander, III et al. | |
| 9,171,019 B1 | 10/2015 | Donlan | |
| 9,817,703 B1 * | 11/2017 | Ryland | G06F 9/524 |
| 2005/0071320 A1 | 3/2005 | Chkodrov et al. | |
| 2006/0190504 A1 | 8/2006 | Pruet, III | |
| 2007/0282838 A1 * | 12/2007 | Shavit | G06F 9/3004 |
| 2009/0172701 A1 | 7/2009 | Gamaley et al. | |
| 2010/0211682 A1 | 8/2010 | Capomassi et al. | |
| 2012/0079483 A1 * | 3/2012 | Kahlon | G06F 9/524 718/100 |

(Continued)

OTHER PUBLICATIONS

Final Office Action on co-pending U.S. Appl. No. 14/928,481 dated Jun. 29, 2018.

(Continued)

*Primary Examiner* — Matthew J Ellis
(74) *Attorney, Agent, or Firm* — Klein, O'Neill & Singh, LLP

(57) ABSTRACT

Presented herein are methods, non-transitory computer readable media, and devices for integrating a hybrid model of fine-grained locking and data-partitioning wherein fine-grained locking is added to existing systems that are based on hierarchical data-partitioning in order in increase parallelism with minimal code re-write. Methods for integrating a hybrid model of fine-grained locking and data-partitioning are disclosed which include: creating, by a network storage server, a plurality of domains for execution of processes of the network storage server, the plurality of domains including a domain; creating a hierarchy of storage filesystem subdomains within the domain, wherein each of the subdomains corresponds to one or more types of processes, wherein at least one of the storage filesystem subdomains maps to a data object that is locked via fine-grained locking; and assigning processes for simultaneous execution by the storage filesystem subdomains within the domain and the at least one subdomain that maps to the data object locked via fine-grained locking.

17 Claims, 4 Drawing Sheets

(56) References Cited

U.S. PATENT DOCUMENTS

| | | | |
|---|---|---|---|
| 2012/0137075 A1* | 5/2012 | Vorbach | G06F 9/526 |
| | | | 711/122 |
| 2012/0166757 A1 | 6/2012 | Volvovski et al. | |
| 2014/0149515 A1* | 5/2014 | Grunwald | H04L 67/1087 |
| | | | 709/205 |
| 2014/0181833 A1 | 6/2014 | Bird et al. | |

OTHER PUBLICATIONS

Non-Final Office Action on co-pending U.S. Appl. No. 14/928,481 dated Jan. 19, 2018.
Non-Final Office Action on co-pending U.S. Appl. No. 14/926,481 dated Nov. 20, 2018.
Notice of Allowance on co-pending U.S. Appl. No. 14/928,481 dated Jun. 2, 2019.

* cited by examiner

HYBRID MODEL OF FINE-GRAINED LOCKING AND DATA PARTITIONING

TECHNICAL FIELD

The present disclosure relates generally to mass data storage networks and data storage filing systems. More particularly, aspects of this disclosure relate to methods, non-transitory computer readable media, and devices for integrating a hybrid model of fine-grained locking and data-partitioning wherein fine-grained locking is added to existing systems that are based on hierarchical data-partitioning in order in increase parallelism with minimal code re-write.

BACKGROUND

The possibilities for parallel computing have greatly increased with the availability of multiprocessor systems. A multiprocessor system increases processing by executing tasks or processes on two or more processors. Depending on the multiprocessor system design, these tasks may run on several or several hundred processors concurrently. Managing concurrent execution on multiprocessor systems involves safeguarding data from modification by multiple processes. Indeterminate results, deadlocks, and data corruption may result if multiple tasks modify or access the same dataset. Accordingly, concurrent execution conditions on multiprocessor systems are managed to assure the proper access of data.

Conventional solutions resolve concurrent execution conditions using different types of locks or dividing processes into multiple domains. For example, fine-grained locking manages concurrent execution on multiple processors by dividing a task into many smaller pieces of code. Placing locks around these small pieces of code keeps them from being accessed or modified by other tasks. However, fine-grained locking is expensive in terms of computer processing, and requires code to be rewritten for each task. On the other hand, data partitioning operates differently from the fine-grained locking approach. Instead of using locks, data partitioning divides tasks (e.g., threads) along functional barriers into domains of tasks having similar functionality. The functional barriers represent a logical separation of tasks into different domains where these tasks can be run in parallel on different processors without conflict, with minimal sharing of data, and with minimal use of locks.

In data partitioning, threads to be executed are divided into a set of domains according to their functionality and tasks they perform. Therefore, a "domain," as used herein, refers to a grouping of threads based on a common functionality. Based upon this division, threads in the different domains may be scheduled to execute in parallel on multiple processors because, for example, threads in different domains generally have different functionalities and do not operate on the same data for the most part, thereby allowing them to execute in parallel without conflict. However, threads within each domain that share data and data structures can be limited to serialized execution on a single processor to avoid data contention or corruption.

Referring to FIG. 1, a high-level block diagram showing an example of data partition hierarchy. This hierarchy permits certain subdomains to execute their processes in parallel with processes of other subdomains, but prevents other subdomains from executing their processes in parallel with processes of any other subdomain or with processes of some other subdomains. Any subdomains that have an ancestral (vertical) relationship to each other within the hierarchy are precluded from executing their processes in parallel with each other, whereas subdomains that do not have an ancestral relationship to each other within the hierarchy are normally permitted to execute their processes in parallel with each other.

The hierarchy of subdomains can be thought of as a hierarchy of reader and writer locks. When running a process in a subdomain, that subdomain in essence has an exclusive writer lock on all of its child subdomains, and a shared reader lock on all of its ancestors subdomains. Note that for purposes of this description, the subdomain hierarchy can be thought of as an inverted tree structure, where descendency goes from bottom to top in FIG. 1. Thus, in FIG. 1 the "child" of a given subdomain (if it has any) would be located above that subdomain and the parent of that subdomain (if it has any) would be located below it. The hierarchy of subdomains in FIG. 1 first includes a Serial subdomain. Above the Serial subdomain, the hierarchy further includes an Aggregate subdomain. Above the Aggregate subdomain, the hierarchy further includes an Aggr-VBN subdomain and one or more volume ("Vol") subdomains, i.e., one Vol subdomain for each volume. Above the Vol subdomains, the hierarchy further includes one or more Volume-Logical ("Vol-Logical") subdomains, one for each volume, and one or more Volume-VBN ("Vol-VBN") subdomains, one for each volume. Above each Vol-Logical subdomain, the hierarchy further includes one or more Stripe subdomains. As used in this description, the term "VBN" stands for volume block number and means a block index into a flat data container, such as either an aggregate (e.g., in the case of Aggr-VBN) or a volume (e.g., in the case of Vol-VBN).

Vol I inherits the permissions of the subdomains located above it. Therefore, a thread from this subdomain could run and perform any of the operations that are typically associated with the subdomains that exist above it. However, threads from two different partitions are unable to run at the same time if they share a common path to the ancestor (e.g., stripe N and Vol-Logical_1). In this case, stripe N cannot run simultaneous with Vol-Logical_1 because these subdomains share permissions that are inherited downward. Vol-Logical_1 will have inherited the permissions of StripeN. Allowing two threads with the same permissions to run can cause a race because the subdomains are protected exclusively by the data partitioning. Therefore, data partition ensures that only one thread running at a time has acquired the permission necessary.

Figure 1:
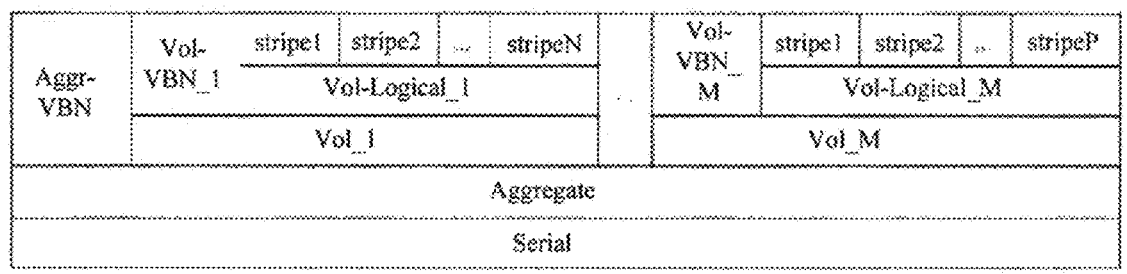
FIG. 1 is a high-level block diagram showing an example of data partitions.

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF ILLUSTRATED EXAMPLES

The present disclosure is directed to a system and method for integrating a hybrid model of fine-grained locking and data-partitioning; wherein fine-grained locking is added to existing systems that are based on hierarchical data-partitioning in order in increase parallelism with minimal code re-write. In a hierarchical model of data partitioning, two objects of the same general type that have data partition mappings must be accessed. For example, while operating on one object, an auxiliary object must be updated to reflect changes to the first. It is likely that these two objects map to different data partitions. In such a case, the thread performing the two operations must run in a more exclusive data partition that excludes both relevant data partitions. This restriction harms performance because it limits parallelism as fewer data partitions are available to run in parallel. As used herein, the term "mass data storage system" generally refers to the computer-executable code operable on a computer to perform a storage function that manages data access and may, in the case of a storage system, implement data access semantics of a general purpose operating system. The mass data storage system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. It should be noted that while this description is written generally in terms of a log-structured file system, the teachings of the present disclosure may be utilized with any suitable file system, including a write anywhere file system.

It is desirable to improve the performance of storage servers, and one way to do so is by integrating a hybrid model of fine-grained locking and data-partitioning. Aspects of this disclosure are directed to methods, non-transitory computer readable media, and devices for enabling different objects of the same general type to be protected by either fine-grained locking or data partitioning in a hierarchical model of parallelism, as suits their collective access properties. The objects protected by fine-grained locking are safe to access from any data partition. In this embodiment, the thread accessing the two objects can be mapped to the partition of an object that is protected by data partitioning. The other object accessed from this partition can be protected by fine-grained locking. This approach allows the thread to run safely from a finer data partition. That is, since one object can only be accessed from a specific partition and the other can now be accessed from any partition due to its protection under fine-grained locking, the operation can run in the data partition corresponding to the first object. The disclosed embodiment provides a hybrid model in the sense that of two different objects of the same type, one is protected by data partitioning and the other is protected by fine-grained locking. With such a scheme, the system can achieve higher parallelism due to the reduced use of coarse data partitions for operations requiring access to two different objects of the same general type. In addition, none of the code that accesses one of the objects needs to be updated at all, as it continues to exclusively use data partitioning as before.

For at least some embodiments, an individual object may be protected by a combination of fine-grained locking and data partitioning in a hierarchical model of parallelism. An object that is protected by data partitioning can be changed to be protected by fine-grained locking. During this migration, a coarse data partition that excludes all necessary fine partitions can be chosen to retain private access to that object. That is, a coarser data partition will continue to provide lock-free data partitioned access to the object. As such, a single object is protected by a combination of fine-grained locking and data partitioning. With such a scheme, only specific accesses to the object that need to run in a fine partition for performance reasons must be updated to use locking to protect the object. Object accesses that are not performance critical can continue to use the existing lockfree code associated with data partitioning as long as the threads run in the coarse partition. Although it is possible to protect the object in question exclusively using fine-grained locking, such a change requires all code that operates on that object to be re-written to use locking which is onerous and can be prohibitively expensive. A different data partition higher up in the partition hierarchy can be chosen such that all required accesses occur from within this new partition's hierarchy. Since accesses to the object from outside of this hierarchy are prevented, the new chosen partition provides lock-free exclusive access to the object.

Figure 2:
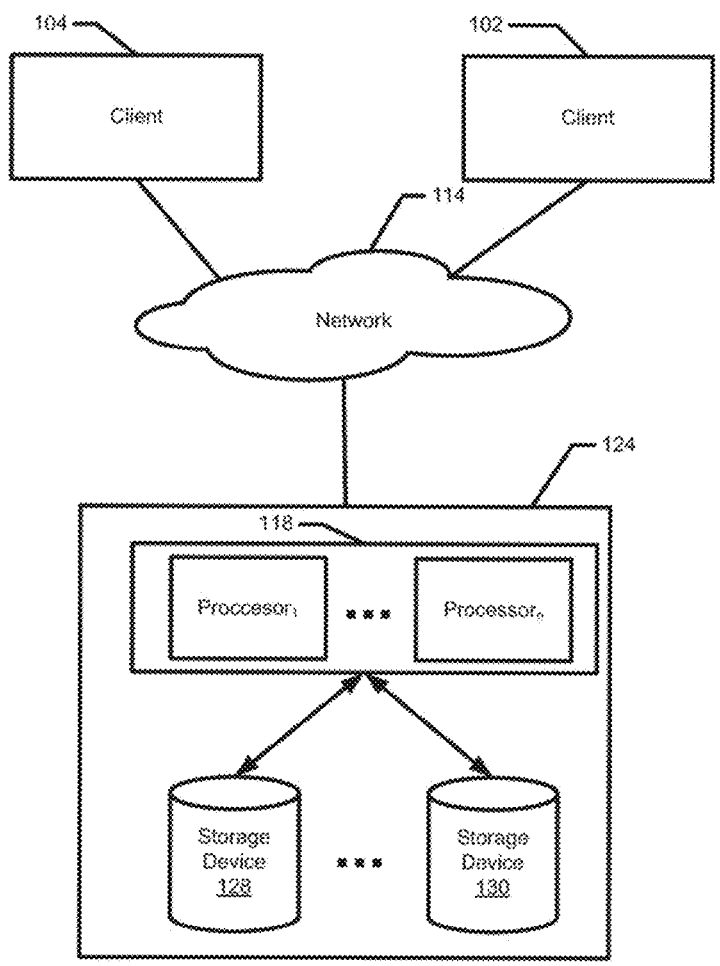
FIG. 2 is a block diagram of an example of a multiprocessor system, in accordance with some embodiments of the present disclosure.

Referring now to the drawings, wherein like reference numerals refer to like features throughout the several views, there is shown in FIG. 2 depicts a block diagram of an example of a multiprocessor system 100, in accordance with some embodiments of the present disclosure. The multiprocessor system 100 includes clients 102 and 104 and storage server 124. The clients 102 and 104 may be computers or other processing systems capable of accessing the storage server 124 either directly or indirectly over a network 114. The clients 102 and 104 may access the storage server 124 over the network 114 using wireless or wired connections supporting one or more point-to-point links, shared local area networks (LAN), wide area networks (WAN), or other access technologies. These clients 102 and 104 may be accessing data, applications, raw storage, or various combinations thereof stored on the storage server 124.

In this example, the multiprocessor system 100 is a type of storage system that provides storage services to clients 102 and 104 using, for example, storage area network (SAN), network-attached storage (NAS), or other storage technologies processed on multiple processors 118. However, it should be appreciated that alternate embodiments of the multiprocessor system 100 may deliver other types of computer services on a multiprocessor platform. For example, the storage server 124 may include web server technologies that deliver web pages and web services to the clients 102 and 104 over the Internet. In other embodiments, the storage server 124 may include other general purpose applications that can deliver various functionalities or data to the clients 102 and 104.

The storage server 124 is configured to operate according to a client/server model of information delivery thereby allowing multiple clients 102 and 104 to access files or other data simultaneously. In this model, the client 102 or 104 may be a computer running an application, such as a file-system protocol. Each client 102 or 104 may request the services of the storage server 124 by issuing storage-system protocol messages. For example, the clients 102 and 105 can request to either read data from or write data to the storage server 124.

In the example of FIG. 2, the storage server 124 is a file-level server, such as a server used in a NAS environment, a block-level storage server used in a SAN environment, or other storage systems capable of providing both file-level and block-level service. For example, the storage server 124 may use a combination of software and hardware to provide storage services including the organization of information on storage devices 128 and 130, such as disks. The storage server 124 includes a file system to organize logically the information as a hierarchical or other structure of directories and files on the disks 128 and 130.

Although the storage server 124 is illustrated as a single unit in FIG. 2, it can also be implemented in a distributed architecture. For example, the storage server 124 can be implemented with multiple distributed storage servers (not shown). Additionally, the storage server 124 can also include a physically separate network module and disk module (not shown), which communicate with other storage servers over an external interconnect. The network module functions as a front-end of the storage server 124, exporting services to the clients 102 and 104. The disk module functions as the back-end, managing and implementing a parity declustered distribution of a Redundant Array of Independent Disks (RAID) organization on the underlying storage of the storage server 124.

In a multiprocessor system 100, the storage server 124 uses two or more processors, as represented by processors 118, which may also include multiple core processor designs. The processors 118 represent two or more computational units available in the storage server 124, may be a physical aggregation of multiple individual processors that each individually execute threads. Alternate implementations of processors 118 may be a single processor having multiple on-chip cores that may partition and share certain resources on the processor die such as the L1/L2 cache. Therefore, the term "processor," as used herein, could be applied to designs utilizing one core or multiple cores found on a single chip or die. Likewise, thread execution is used to describe the act of executing a set of related instructions on one or several processors. As used herein, a "thread" refers to a separate stream of execution that takes place simultaneously with and independently of other steams of execution. As an example, a thread can be a single sequence of instructions executed in parallel with other sequence of instructions, either by time slicing or multiprocessing. This allows a program to split itself into two or more simultaneously running tasks. Unlike processes, multiple threads can share state information of a single process, share memory, and other resources directly.

Figure 3:
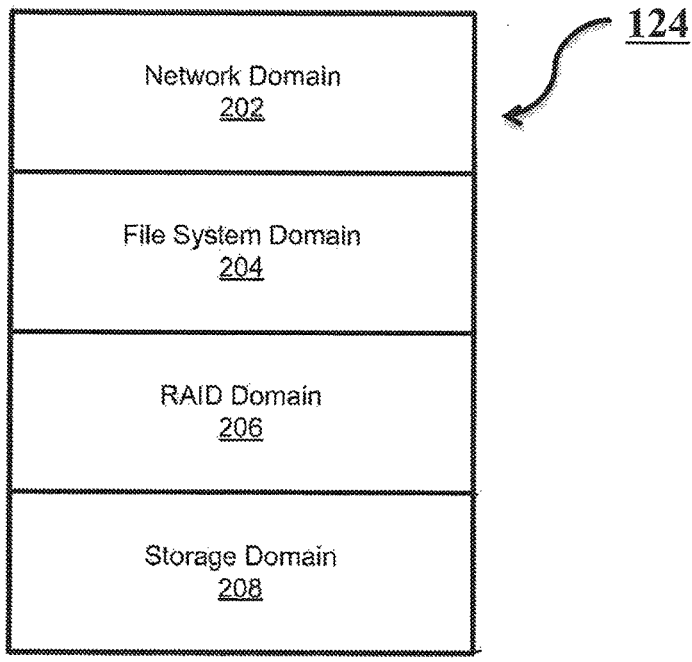
FIG. 3 is a block diagram illustrating examples of multiple domains, in accordance with some embodiments of the present disclosure.

In accordance with embodiments of the present disclosure, the storage system 124 can be configured to adjust a number of threads for execution by the processors 118 based on monitoring utilizations of multiple domains. FIG. 3 depicts a block diagram illustrating examples of multiple domains, consistent with an embodiment. It should be appreciated that threads to be executed are divided into a set of domains according to their functionality and tasks they perform. Therefore, a "domain," as used herein, refers to a grouping of threads based on a common functionality. Accordingly, threads are scheduled according to their assigned domain, which allow for multiprocessor parallel execution, in accordance with an embodiment of the present disclosure. For example, as depicted in FIG. 3, a storage server may implement multiprocessing using the following set of domains: a network domain 202, file system domain 204, a RAID domain 206, and a storage domain 208. As implied by their names, the network domain 202 includes threads related to performing network specific functions. The file system domain 204 includes threads related to file system functions. The RAID domain 206 includes threads dealing with implementing the RAID functions and different levels of RAID (e.g., RAID-0 through RAID-5). The storage domain 208 includes threads directly related to operating storage devices.

Figure 4:
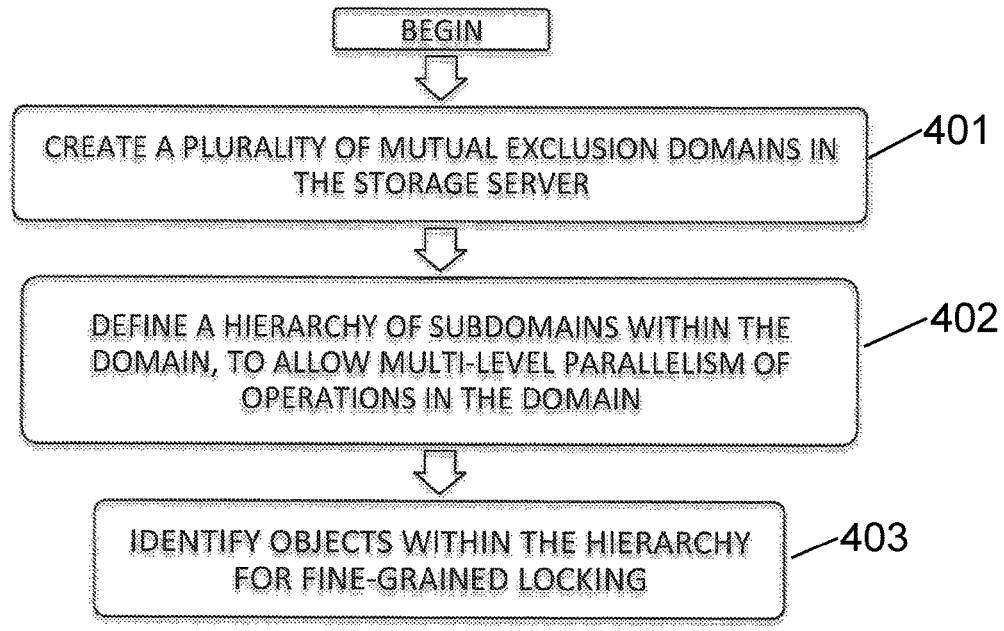
FIG. 4 illustrates at a high level a technique for achieving integrating a hybrid model of fine-grained locking and data-partitioning.
Figure 5:
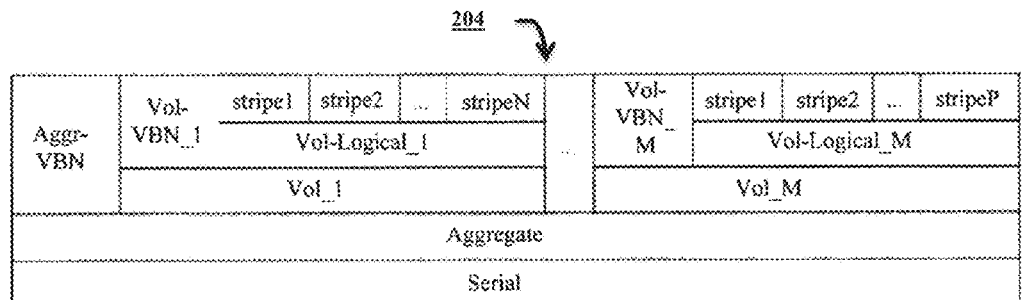
FIG. 5 is an example of the structure of an exemplary Filesystem domain.

FIG. 4 illustrates the technique introduced here at a high level, according to one embodiment. The technique includes, at 401, creating a plurality of domains in the storage server. The storage system 124 can be organized into a number of domains 202-208 according to their functionality, as shown in FIG. 3. A domain is a grouping of processes. The domains are defined according to functionality because typically it is not permitted for two processes in different domains to operate on the same data simultaneously. The technique further includes, at 402, defining a hierarchy of subdomains within the domain, to allow multi-level parallelism of operations in the domain. FIG. 5 illustrates the structure of the Filesystem Domain 204 according to an embodiment. As shown, the Filesystem Domain 204 includes multiple subdomains, related to each other in a hierarchy, where each of the subdomains owns one or more types of processes and operates as an execution queue (i.e., only one process can execute at a time in each subdomain).

Many processes are associated with one or more specific types of data or metadata upon which they operate; consequently, most of the subdomains can be viewed as being associated with one or more particular classes of data or metadata. Hence, some of these subdomains are dedicated for specific types of metadata and associated processes while others are dedicated for user data and associated processes. The hierarchy of subdomains can be thought of as a hierarchy of reader and writer locks. When running a process in a subdomain, that subdomain in essence has an exclusive writer lock on all of its child subdomains, and a shared reader lock on all of its ancestors subdomains. Note that for purposes of this description, the subdomain hierarchy can be thought of as an inverted tree structure, where descendency goes from bottom to top in FIG. 5. Thus, in FIG. 5 the "child" of a given subdomain (if it has any) would be located above that subdomain and the parent of that subdomain (if it has any) would be located below it.

Referring back to FIG. 4, the process further includes, at 403, identifying objects within the hierarchy for fine-grain locking. Typically, fine-grained locking manages concurrent execution on multiple processors by dividing a task into many smaller pieces of code. As a result, as the task changes, the code requires rewriting as well. Therefore, user data would not be a likely candidate for fine-grain locking. However, metadata used by the storage server are great candidates for fine-grained locking. Placing locks around these small pieces of code keeps them from being accessed or modified by other processes. Locks and communication between processes can be used to increase the number of processors used in parallel processing. In some embodiments, objects may be protected by a combination of fine-grained locking and data partitioning in a hierarchical model of parallelism. These operations 401-403 may be carried out by the storage system 124, for example.

Figure 6:
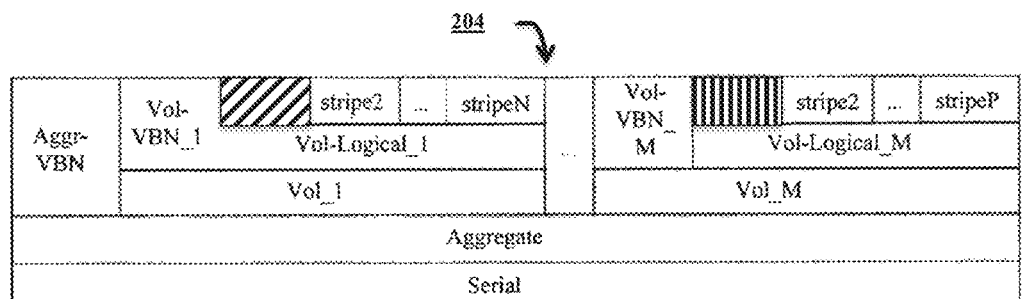
FIG. 6 is an example of the structure of the Filesystem Domain according to an embodiment.

FIG. 6 illustrates the structure of the Filesystem Domain 204 according to an embodiment. As shown, the Filesystem Domain 204 includes multiple subdomains, related to each other in a hierarchy, where each of the subdomains owns one or more types of processes and operates as an execution queue (i.e., only one process can execute at a time in each subdomain). The thread accessing two objects can be mapped to the partition of the data mapping to stripe 1 of Vol-Log M that is protected by data partitioning (represented by vertical stripes) and the data that would normally be mapped to stripe 1 of Vol-Log 1 can be instead protected by fine-grained locking (represented by a diagonal stripes) and therefore and accessed from partition stripe 1 of Vol-Log M access. This approach allows the thread to run safely from a finer data partition. That is, since the data mapping to stripe 1 of Vol-Log M can only be accessed from a specific partition and stripe 1 of Vol-Log 1 can now be accessed from any partition, the operation in question can run in the data partition corresponding to stripe 1 of Vol-Log M.

Figure 7:
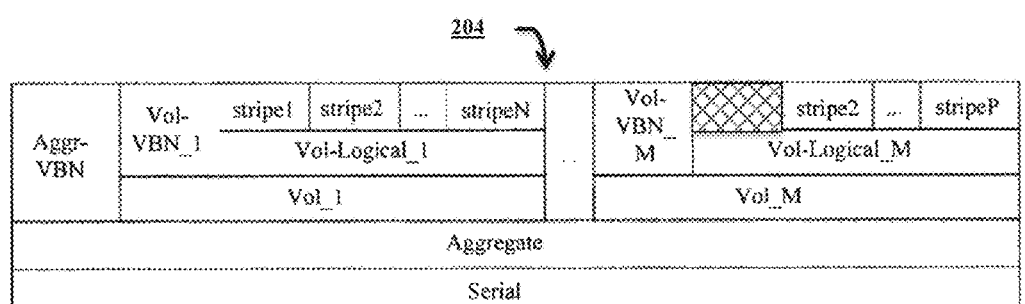
FIG. 7 is an example of the structure of the Filesystem Domain according to another embodiment.

FIG. 7 illustrates the structure of the Filesystem Domain 204 according to an embodiment. As shown, the Filesystem Domain 204 includes multiple subdomains, related to each other in a hierarchy, where each of the subdomains owns one or more types of processes and operates as an execution queue (i.e., only one process can execute at a time in each subdomain). The object that formerly would have mapped to stripe 1 of Vol-Log M is protected by a combination of fine-grained locking and data partitioning in a hierarchical model of parallelism. During this migration, a coarse data partition that excludes all necessary fine partitions can be chosen to retain private access to data that would formerly have mapped to stripe 1 of Vol-Log M. That is, a coarser data partition will continue to provide lock-free data partitioned access to stripe 1 of Vol-Log M. As such, the data formerly mapping to stripe 1 of Vol-Log M is protected by a combination of fine-grained locking and data partitioning. The advantage of this approach is that only specific accesses to stripe 1 of Vol-Log M that need to run in a fine partition for performance reasons must be updated to use locking to protect the object. Object accesses that are not performance critical can continue to use the existing lockfree code as long as the threads run in the coarse partition. Although it is possible to protect the data formerly mapping to stripe 1 of Vol-Log M exclusively using fine-grained locking, such a change requires all code that operates on that object to be re-written to use locking which is onerous and can be prohibitively expensive.

Figure 8:
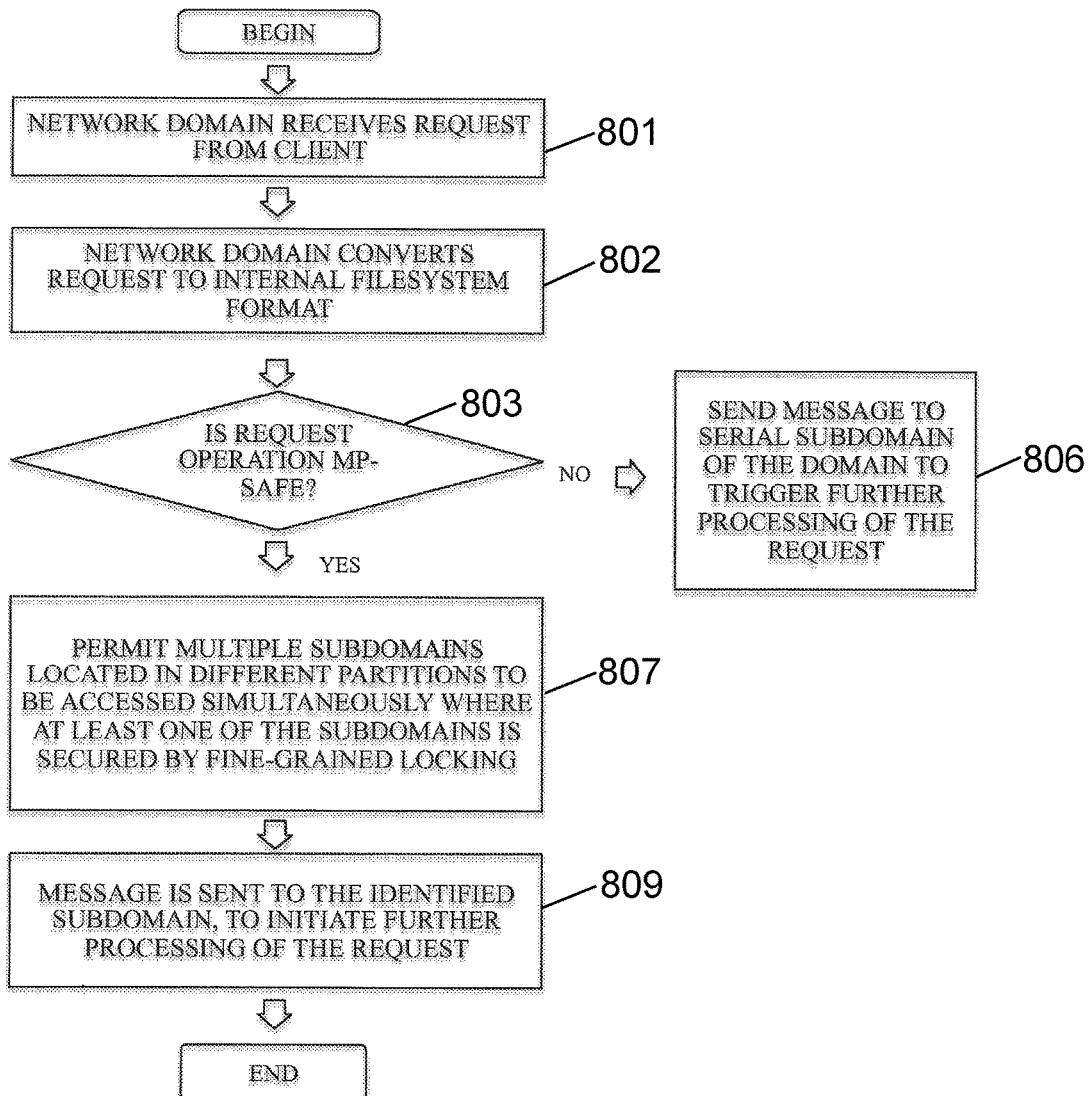
FIG. 8 is a flowchart of an exemplary method for integrating a hybrid model of fine-grained locking and data-partitioning in accordance with aspects of the present disclosure.

FIG. 8 illustrates an exemplary method for integrating a hybrid model of fine-grained locking and data-partitioning that can be performed by the storage server 124. At 801, when a client 102 transmits a request to the storage server 124, initially the Network domain 202 in the storage server 124 receives the request. At 802 the Network domain 202 converts the request to an internal format recognized by the filesystem 204. The Network domain 202 then determines at 803 whether the requested operation is inherently multiprocessor-safe ("MP-safe"). In general, the storage server 124 is preconfigured with knowledge of which operations are inherently MP-safe. These operations may include, for example, reads and writes.

If the requested operation is not inherently MP-safe, the flow proceeds to 806, in which a message is sent to an appropriate process within the Serial subdomain of the Filesystem domain 204, to trigger further processing of the request. The specific type of process depends on the nature of the requested operation. If the operation is inherently MP-safe, then the flow instead proceeds from 803 to 804. At 804, the filesystem 204 allows multiple subdomains located in different partitions to be accessed simultaneously where at least one of those subdomains is secured by fine-grained locking. This may be desirable in order to service a request (e.g., read or write) that targets user data (or metadata) spanning two or more stripes located in different partitions. At 805, therefore, a message is sent to the identified subdomain, to initiate further processing of the request. The method then ends.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects.

What is claimed:

1. A method, comprising:
    identifying by a first processor of a multi-processor storage server, a first object in a first sub-domain of a file system domain of a storage server domain hierarchy for protection by fine grain locking, based on an object type indicating whether the first object is a candidate for fine grain locking;
    wherein the fine grain locking divides a task associated with the first object into multiple tasks using a plurality code segments, each code segment protected by a lock;
    wherein different segments of the first object are simultaneously accessible by a first process of a thread in the first subdomain executed by the first processor and a second process of the thread in a second sub-domain executed by a second processor of the storage server, the first and second subdomains separated logically by a data partition;
    using the data partition to manage lock free access to a second object in the second sub-domain by the second process without having to update code for the second process;
    wherein the first object and the second object are of a same object type and the second process of the thread is mapped to the second object protected by the data partition; and
    executing an operation for the thread by providing access to the first object in parallel to the first process and the second process, and providing lock free access to the second object only to the second process executed from the second sub-domain; wherein prior to execution, the operation is identified as being safe for execution by the first and the second processor.

2. The method of claim 1, wherein the first subdomain is a metadata subdomain.

3. The method of claim 1, wherein the second subdomain is a user data subdomain.

4. The method of claim 1, wherein a third object is protected by a combination of fine-grain locking and data partitioning.

5. The method of claim 1, wherein the second object protected by data partitioning is changed to be protected by fine-grained locking by a migration process using a coarse data partition during the migration process.

6. The method of claim 5, wherein the coarse data partition provides lock-free access to the second object for operations that do not impact thread execution performance.

7. A non-transitory machine-readable medium having stored thereon instructions for performing a method comprising machine executable code which when executed by at least one machine, causes the machine to:
    identify by a first processor of a multi-processor storage server, a first object in a first sub-domain of a file system domain of a storage server domain hierarchy for protection by fine grain locking, based on an object type indicating whether the first object is a candidate for fine grain locking;
    wherein the fine grain locking divides a task associated with the first object into multiple tasks using a plurality code segments, each code segment protected by a lock;
    wherein different segments of the first object are simultaneously accessible by a first process of a thread in the first subdomain executed by the first processor and a second process of the thread in a second sub-domain executed by a second processor of the storage server, the first and second subdomains separated logically by a data partition;
    use the data partition to manage lock free access to a second object in the second sub-domain by the second process without having to update code for the second process;
    wherein the first object and the second object are of a same object type and the second process of the thread is mapped to the second object protected by the data partition; and
    execute an operation for the thread by providing access to the first object in parallel to the first process and the second process, and providing lock free access to the second object only to the second process executed from the second sub-domain; wherein prior to execution, the operation is identified as being safe for execution by the first and the second processor.

8. The non-transitory machine-readable medium of claim 7, wherein the first subdomain is a metadata subdomain.

9. The non-transitory machine-readable medium of claim 7, wherein the second subdomain is a user data subdomain.

10. The non-transitory machine-readable medium of claim 7, wherein a third object is protected by a combination of fine-grain locking and data partitioning.

11. The non-transitory machine-readable medium of claim 7, wherein the second object protected by data partitioning is changed to be protected by fine-grained locking by a migration process using a coarse data partition during the migration process.

12. The method of claim 11, wherein the coarse data partition provides lock-free access to the second object for operations that do not impact thread execution performance.

13. A computing device, comprising:
    a memory containing machine readable medium comprising machine executable code having stored thereon instructions for performing a method; and
    a processor of a multi-processor storage server coupled to the memory, the processor configured to execute the machine executable code to:
    identify by a first processor of the multi-processor storage server, a first object in a first sub-domain of a file system domain of a storage server domain hierarchy for protection by fine grain locking, based on an object type indicating whether the first object is a candidate for fine grain locking;
    wherein the fine grain locking divides a task associated with the first object into multiple tasks using a plurality code segments, each code segment protected by a lock;
    wherein different segments of the first object are simultaneously accessible by a first process of a thread in the first subdomain executed by the first processor and a second process of the thread in a second sub-domain executed by a second processor of the storage server, the first and second subdomains separated logically by a data partition;
    use the data partition to manage lock free access to a second object in the second sub-domain by the second process without having to update code for the second process;
    wherein the first object and the second object are of a same object type and the second process of the thread is mapped to the second object protected by the data partition; and
    execute an operation for the thread by providing access to the first object in parallel to the first process and the second process, and providing lock free access to the second object only to the second process executed from the second sub-domain; wherein prior to execution, the operation is identified as being safe for execution by the first and the second processor.

14. The computing device of claim 13, wherein the first subdomain is a metadata subdomain.

15. The computing device of claim 13, wherein the second subdomain is a user data subdomain.

16. The computing device of claim 13, wherein a third object is protected by a combination of fine-grain locking and data partitioning.

17. The computing device of claim 13, wherein the second object protected by data partitioning is changed to be protected by fine-grained locking by a migration process using a coarse data partition during the migration process.

* * * * *